United States Patent [19]

Kline et al.

[11] 4,026,529

[45] May 31, 1977

[54] FEED MATERIAL MIXING APPARATUS

[75] Inventors: Charles M. Kline, Reinholds; Thomas W. Waldrop, New Holland, both of Pa.

[73] Assignee: Sperry Rand Corporation, New Holland, Pa.

[22] Filed: Feb. 23, 1976

[21] Appl. No.: 660,212

[52] U.S. Cl. .................................. 259/7; 259/97
[51] Int. Cl.² ..................... B01F 5/12; B01F 7/24
[58] Field of Search ................ 259/6, 7, 8, 21–24, 259/41–44, 97; 241/101 B, 101.5, 101.6

[56] References Cited

UNITED STATES PATENTS

| | | | |
|---|---|---|---|
| 1,446,639 | 2/1923 | Cleve | 259/43 |
| 1,466,499 | 8/1923 | Fletcher | 259/97 X |
| 1,576,018 | 3/1926 | Wolf | 259/97 X |
| 1,707,999 | 4/1929 | Snyder | 259/23 |
| 2,113,914 | 4/1938 | Day | 259/97 X |
| 3,369,762 | 2/1968 | Buzenberg et al. | 241/63 |
| 3,589,684 | 6/1971 | Dixon | 259/97 |
| 3,667,734 | 6/1972 | Skromme et al. | 259/44 |
| 3,780,993 | 12/1973 | Kline | 259/97 |
| 3,840,189 | 10/1974 | Kanengieter et al. | 241/101 B X |

OTHER PUBLICATIONS

"Brady Hydra–Mills", Brochure No. 15D472NWC, Koehring Farm Division.

*Primary Examiner*—Philip R. Coe
*Attorney, Agent, or Firm*—Frank A. Seemar; Michael R. Swartz; Joseph A. Brown

[57] ABSTRACT

Mixing apparatus having a frame on which a mixing tank is mounted and extending vertically. A hammermill carried on the frame receives and chops different types of feed material. The resulting product is then deposited in a transfer conveyor which transports the material to the mixing tank. A mixing assembly within the tank circulates material to produce a well mixed homogeneous mass. The mixing assembly comprises upper and lower material advancing portions, the lower of which includes a conical shaped core member converging upwardly. One or more rigid crop engaging elements extends outwardly from the lower edge of the core member to enhance the effectiveness of the mixing apparatus.

5 Claims, 6 Drawing Figures

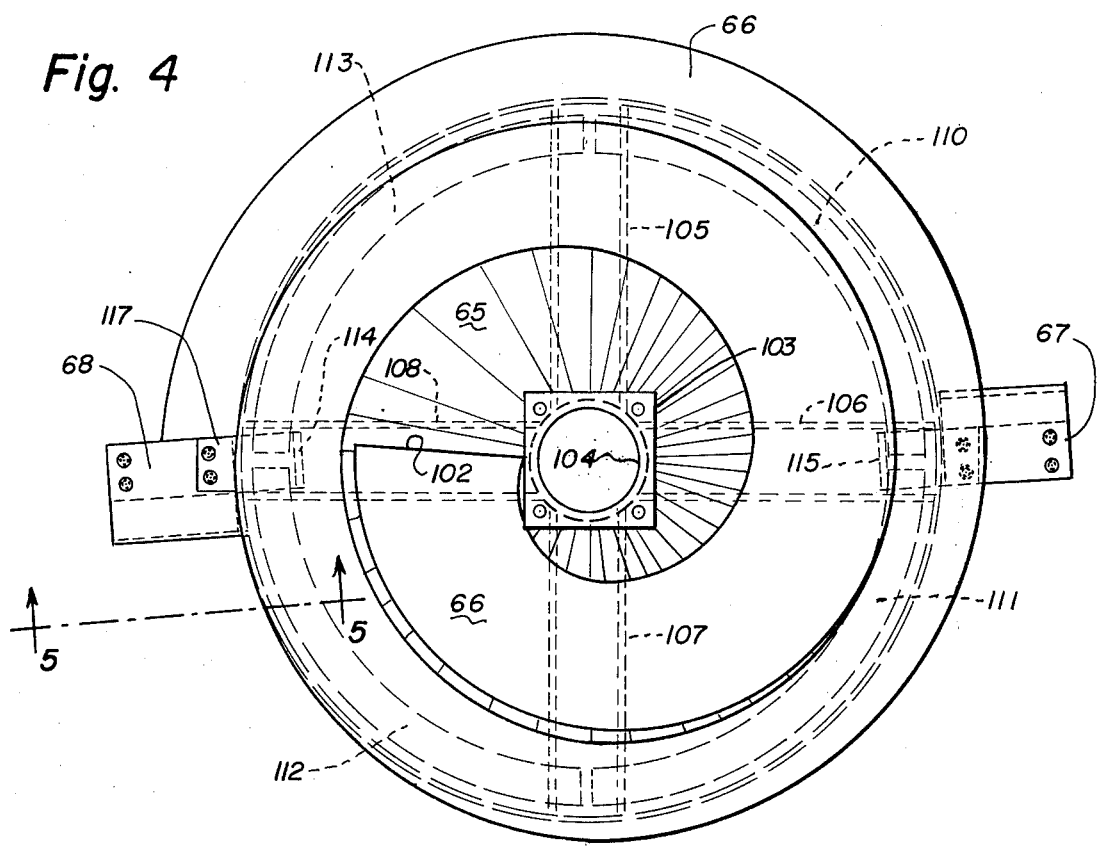
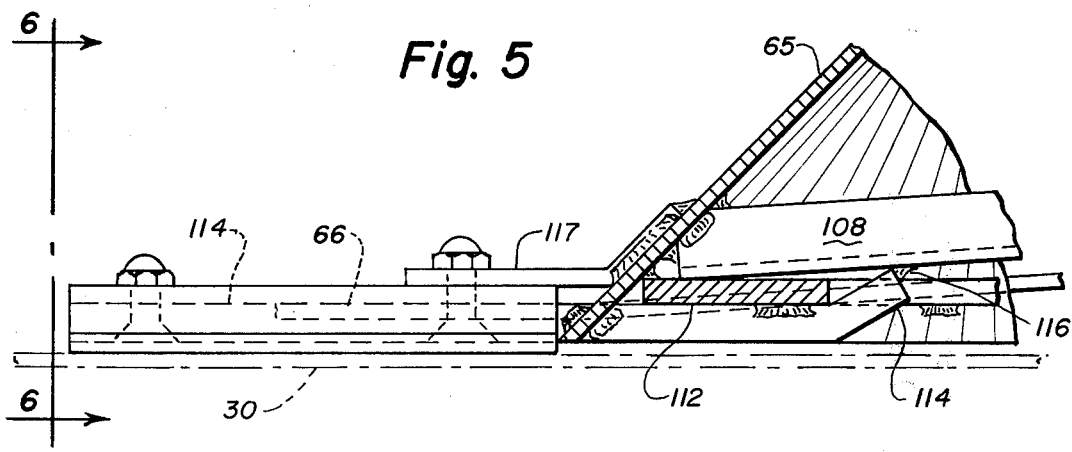
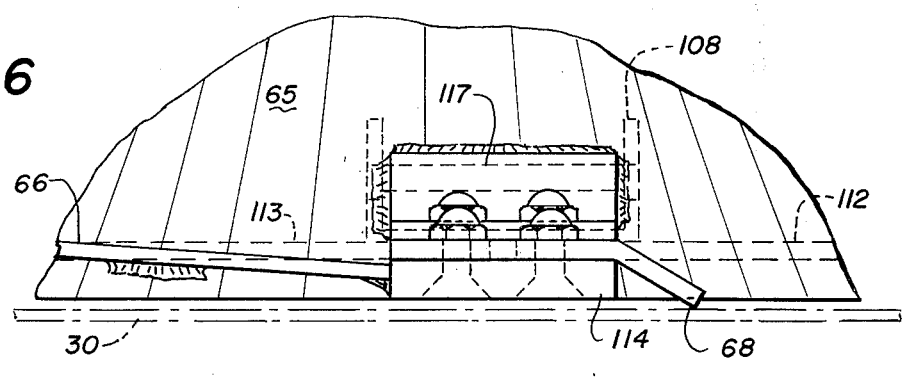

FEED MATERIAL MIXING APPARATUS

CROSS REFERENCES TO RELATES APPLICATIONS

Reference is hereby made to the following co-pending U.S. applications dealing with related subject matter, assigned to the assignee of the present invention and filed on or about the same date as the present application:
1. "Improved Material Advancing Means for a Grinder-Mixer" by Charles M. Kline, Ser. No. 660,602, filed Feb. 23, 1976. (now U.S. Pat. No. 3,997,146)
2. "Feed Material Mixing Apparatus" by Charles M. Kline and Thomas W. Waldrop, Ser. No. 660,204, filed Feb. 23, 1976.

BACKGROUND OF THE INVENTION

The present invention relates to an agricultural grinder-mixer, and more particularly, to a mixing tank configuration having an improved internal mixing assembly for augmenting the proper circulation of material contained in the tank.

Most present day grinder-mixers comprise a vertical mixing assembly mounted concentrically within a vertical mixing tank having a cylindrical upper portion and a conical downwardly converging lower portion. The mixing assembly comprises a centrally located mixing auger mounted for rotation on a vertical axis within a tubular housing. An inlet opening is provided in the housing at its lower end and a discharge opening is provided at the top of the housing. During a mixing operation, material is conveyed in a generally circuitous path. The auger continually transfers material from the bottom of the tank upwardly through the auger housing to the top of the tank whereupon it is discharged through the opening and allowed to gravitate back down toward the lower portion of the mixing tank. Commercially available apparatus of this type is illustrated by U.S. Pat. No. 3,780,993 issued Dec. 25, 1973, to Charles M. Kline, one of the joint inventors of the present invention.

The conical portion of the mixing tank configuration of the grinder-mixer described above functions to direct material inwardly towards the central mixing auger as it settles or gravitates downwardy during circulation. Since the horizontal cross section of the tank decreases as the walls converge inwardly, the material is compressed as it settles causing certain crop materials, especially under moist and/or extremely tough conditions, to form a cluster of relatively solid material. This is illustrative of a problem commonly encountered during operation of a tank having a conventional conical shaped lower portion. Material moving downwardly in the tank tends to build up in the area between the lower walls of the tank and the auger housing. This buildup, commonly referred to as "bridging," restricts free downward flow of material to the base of the mixing tank and thereby impedes the circuitous flow of material and diminishes effectiveness of the central mixing auger. Certain crop conditions lead to more bridging and many times shutdown is necessary to permit manual removal of material from plugged areas.

One prior art arrangement devised to overcome the problem of bridging in the lower tank is shown in U.S. Pat. No. 3,780,993 mentioned above. In this arrangement, the central mixing auger is provided with flighting having a lower section with relatively wider outside dimensions. This configuration is designed to increase the volume of material displaced per revolution and thereby effectively circulate material contained in the tank. Although this type of auger has been generally successful, its overall efficiency drops off under certain crop conditions due to shortcomings stemming from the conical configuration of the tank. This patent also features a plurality of outwardly projecting extensions on the lower auger flighting. As the mixing auger assembly is rotated, the extensions engage and agitate surrounding material to break up clusters of material in the vicinity of the auger and permit the material to gravitate more freely to the base of the tank. Consequently, the extensions further enhance overall circulation of feed material within the tank during a mixing operation. Although this feature generally improves the mixing capability under adverse conditions, it is not entirely satisfactory in that it tends to create turbulence during circulation of dry crop material peculiar to certain regions.

Another prior art approach that has been proffered as a solution to the problem of bridging in the lower tank portion of grinder-mixers is disclosed in U.S. Pat. No. 3,667,734, to A. D. Skromme et al, issued June 6, 1972. In this patent, the tank walls of the grinder-mixer are vertical and when material gravitates to the bottom of the mixing chamber during operation it is engaged by the blade of a long sweep arm rotating with and extending outwardly from the auger shaft. The arm sweeps across a path parallel to and encompassing the entire bottom of the tank. A similar sweep arm is employed in the vertical mixing tank disclosed in U.S. pat. No. 1,576,018, issued Mar. 9, 1926, to R. B. Wolf. In this type of apparatus the tendency of material to wedge under the sweep arm could result in an upward force component causing obvious deleterious effects. This problem is partly alleviated if a guide is used to restrain the outer end. Another shortcoming inherent in a vertical sidewall type configuration stems from the need for a head of pressure for the sweep arm to operate effectively, without which the arm has a tendency to merely slide under the material without changing its relative position in the tank.

This disadvantage is even more prevalent at the end of an unloading operation, i.e., where the absence of a full load affects the ability of the sweep arm to radially urge material toward an unloading port. Thus, the sweep arm seems to operate best under full load conditions but conversely full load conditions tend to cause wedging.

There exists still another prior art approach to the problem of bridgning in grinder-mixers having an inverted conical-shaped lower tank wall portion inclined inwardly for guiding material toward the central mixing auger assembly. For example, apparatus is sold by the Koehring Farm Division of Des Moines, Iowa, wherein the mixing assembly comprises an upper cylindrical auger and a lower auger portion having an inverse frusto-conical shaped core. In this arrangement, this inclined wall commences at the approximate center of the tank and the bottom of the tank is completely covered by the lower core section, as shown and described in Koehring brocure, No. 15D472NWC. A similar configuration is disclosed in U.S. Pat. No. 3,589,684, issued on June 29, 1971, to Bernard Dixon. The Dixon patent also shows a mixing tank with a vertical mixing assembly having a frusto-conical shaped lower core section on a common shaft with an upper cylindrical auger. The upper and lower auger sections are journalled in the tank for rotation within a housing that is flared at the bottom in a shape adapted to accommodate the lower conical portion of the auger. As in Koehring, the lower core completely covers the tank bottom. Lastly with respect to Dixon, even through the flared enclosure section has slotted apertures, the conical portion of the housing under many crop conditions would tend to cause bridging between it and the tank wall due to the convergence of material with no means to rapidly take it away. Bridging problems are exceptionally acute under conditions where crop material is damp as is the case in many areas of the word where grinder-mixers are employed.

SUMMARY OF THE INVENTION

It is, accordingly, the principal object of the present invention to provide a mixing apparatus in which the aforementioned problems of the prior art have been overcome. More particularly, it is an object to provide a machine in which bridging of feed material during a mixing process is substantially reduced and the material is more thoroughly and rapidly mixed without substantially increasing power requirements or cost of the apparatus.

In pursuance of these and other objects, the present invention contemplates new and improved feed mixing apparatus for use in a grinder-mixer having a tank in which an improved centrally located mixing assembly is employed to circulate feed material.

In one embodiment, the mixing apparatus comprises a frame for supporting a tank having a top, a bottom and outer walls for confining the feed material therein during a mixing process. An improved vertical mixing assembly is coaxially mounted within the tank to augment proper circulation. More specifically, the mixing assembly comprises a vertical auger housing and rotatably mounted material advancing means having a first portion comprising a cylindrical vertical auger positioned partly within the housing and adapted to receive material from advancement upwardly through the housing. A second portion of the material advancing means is disposed below and axially aligned for rotation with the first portion, which second portion includes a frusto-conial shaped core member converging upwardly and having spiral flighting extending therefrom to engage and advance material being mixed, circulated or discharged. At least one rigid crop engaging element is fixed to the outer surface of the core member in the vicinity of the bottom of the tank. The element extends substantially parallel to the tank bottom to engage material as it is being introduced to the tank and/or circulated during a mixing process.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed are defining the limits of the invention.

BRIEF DESCRIPTION OF THE DRAWINGS

FIG. 4 is a plan view of the lower portion of the vertical mixing assembly of the machine shown in FIGS. 2 and 3.

FIG. 5 is a fragmentary view taken along lines 5—5 of FIG. 4.

FIG. 6 is a side elevational view taken along line 6—6 of FIG. 5.

DESCRIPTION OF THE PREFERRED EMBODIMENT

Figure 1:
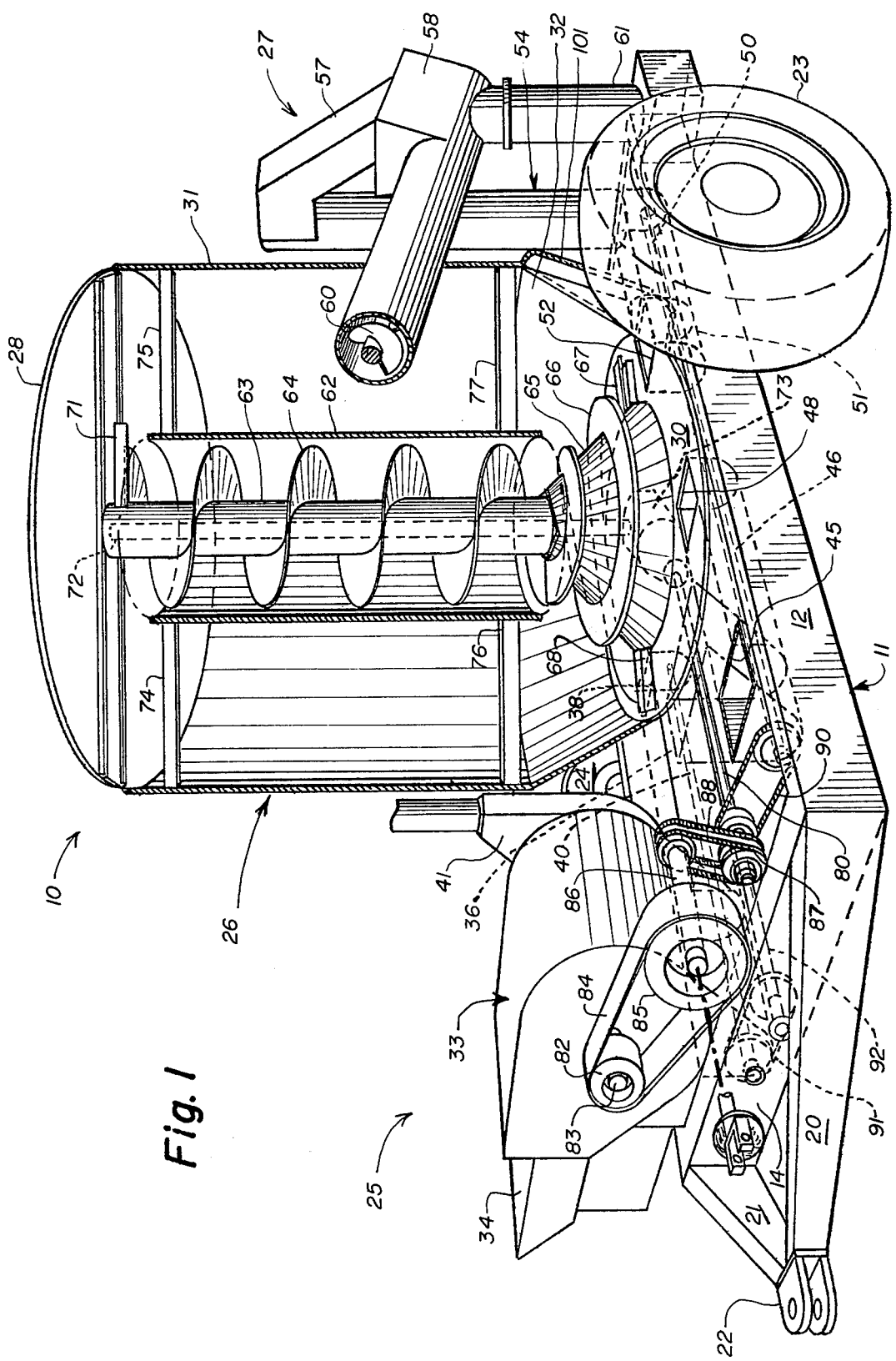
FIG. 1 is a diagrammatic perspective view of a portable grinder-mixer with portions cut away to illustrate a machine in which the present invention may be embodied.

Referring to the drawings for a more detailed description, a grinder-mixer, generally designated by reference numeral 10, is shown in FIG. 1 to illustrate by way of example one embodiment of equipment in which the present invention may be employed. The grinder-mixer 10 comprises a generally fore-and-aft main frame 11 having parallel side members 12 and 13, front and rear cross support means 14 and 15, respectively, a plurality of intermediate support members 16, 17 and 18 (see FIG. 2), and forwardly converging members 20 and 21. A clevis 22, formed at the front of converging members 20 and 21, is adapted to be connected to a drawbar of a tractor (not shown) such that the grinder-mixer may be readily towed from one place to another during which ground engaging support is provided by a pair of wheels 23 and 24. Mounted on frame 11 is an input section 25, a mixing assembly 26 for mixing material received in section 25 and an unloading assembly 27 for unloading mixed material after the mixing operation is completed. The mixing assembly includes a tank having a top 28, a bottom 30 and an outer wall comprising an upper cylindrical section 31 and a lower frusto-conical shaped section 32 extending inwardly and downwardly terminating near bottom 30 of the tank.

The crop input section is disposed forwardly of the tank and includes a hammermill 33 secured to the main frame. The hammermill, not shown in detail, is of a conventional grinder-mixer type which functions to initially grind feed material prior to being transferred to the mixing tank. In the present invention feed material is fed into a hammermill hopper 34 and ground by hammermill 33, including a plurality of rotating hammer elements 35 (shown in phantom in FIG. 3), during which grinding operation a substantial portion of the ground feed is allowed to gravitate into a transfer auger 36 (only partly depicted in FIG. 1) which conveys the ground feed material from hammermill 33 into the mixing tank, via paddles 37 (see FIG. 2) disposed opposite an opening 38 in bottom 30 of the tank. The paddles 37 are mounted on transfer auger shaft 40 and receive material being conveyed in a generally axial direction and throw it upwardly into the tank. That portion of the ground material which is too fine to gravitate into transfer auger 36 is captured in an airstream produced by fan 41 and conveyed upwardly through vertical pipe 42 into a cyclone-type dust collector 43 which functions in a well known manner to centrifugally separate feed material from the air. Feed material separated by dust collector 43 is allowed to gravitate downwardly into the transfer auger 36 via a return pipe 44, shown in FIG. 3 of the drawings, extending vertically along the right side of the cylindrical section of the tank. In this description, right hand and left references are determined by standing to the rear of the portable grinder-mixer and facing the direction of conventional travel.

During normal grinder-mixer operation, it is not uncommon to introduce supplemental feed concentrates to the ground material being mixed in the tank. These feed supplements include high protein additives, minerals, salt, or the like, depending on the end use. Accordingly, the crop input section is provided with a feed concentrate hopper 45 through which concentrated feed additives may be selectively introduced. The additives gravitate to the bottom of concentrate hopper 45 and are conveyed via an auxiliary transfer auger 46 and paddles 47, through opening 48 to the tank in a manner similar to that by which material is conveyed to the tank by main transfer auger 36.

Unloading assembly 27 comprises a horizontal discharge auger 50 (only partly depicted in FIG. 1) rotatably mounted in a trough 51 communicating with the tank via opening 52 in bottom 30. The assembly further compises a vertical discharge auger 53 rotatably mounted within an upright tube 54 communicating at its lowermost end with the rear portion of trough 51. Hereagain radially extending paddles 55 (see FIG. 2) on the shaft of auger 50 assist in the transfer of material from trough 51 to tube 54. Material carried upwardly by vertical discharge auger 53 is thrown outwardly by paddle assembly 56 (see FIG. 3) whereupon it is conveyed downwardly along discharge spout 57 to an unloading auger hopper 58 and thence to an unload auger 60 in communication with such unloading auger hopper. Unload auger 60 and auger hopper 58 are supported by cylindrical housing 61 through which suitable drive means for unload auger 60 are provided. Although not specifically shown, unload auger 60 and unloading auger hopper 58 are pivotally mounted about vertical and transverse axes such that the unload auger 60 is movable sideways and up and down during an unloading operation. The unloading portion of the discharge auger assembly, which does not form a material part of the present invention, can best be appreciated from a study of U.S. Pat. No. 3,638,816 issued FEB. 1, 1972, to William W. Mann and assigned to the assignee of the present application.

Figure 2:
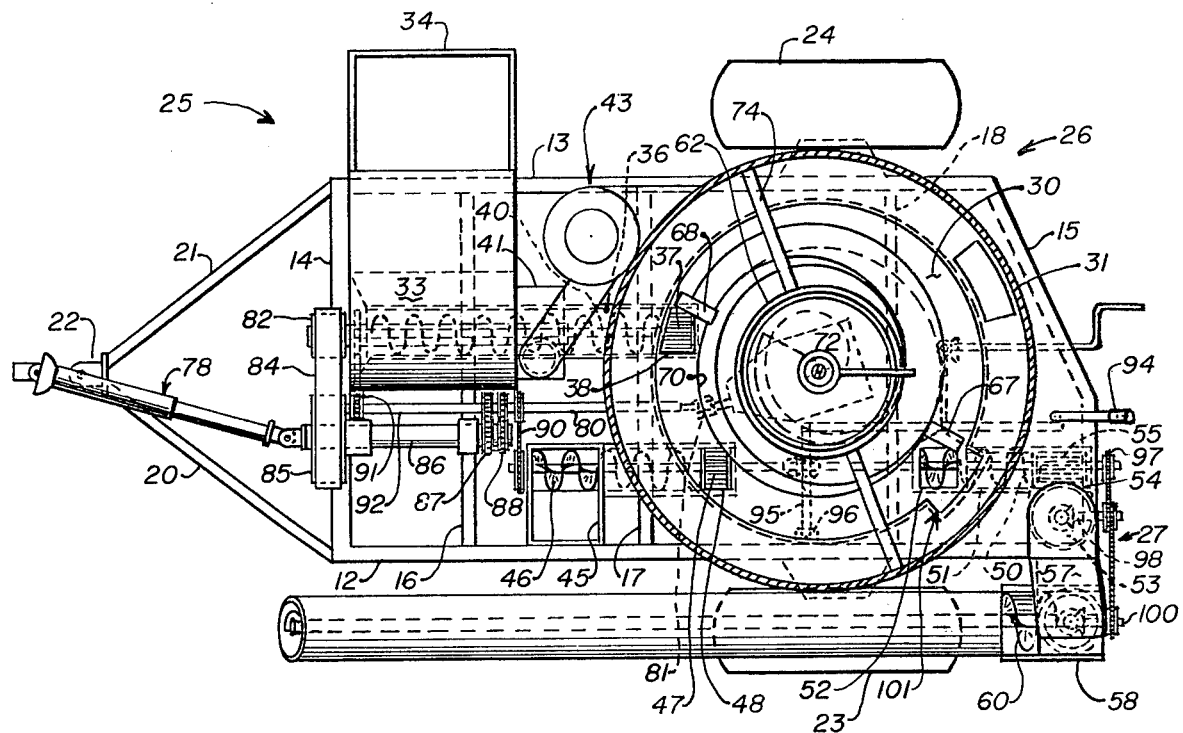
FIG. 2 is a plan view taken along lines 2—2 of FIG. 3.
Figure 3:
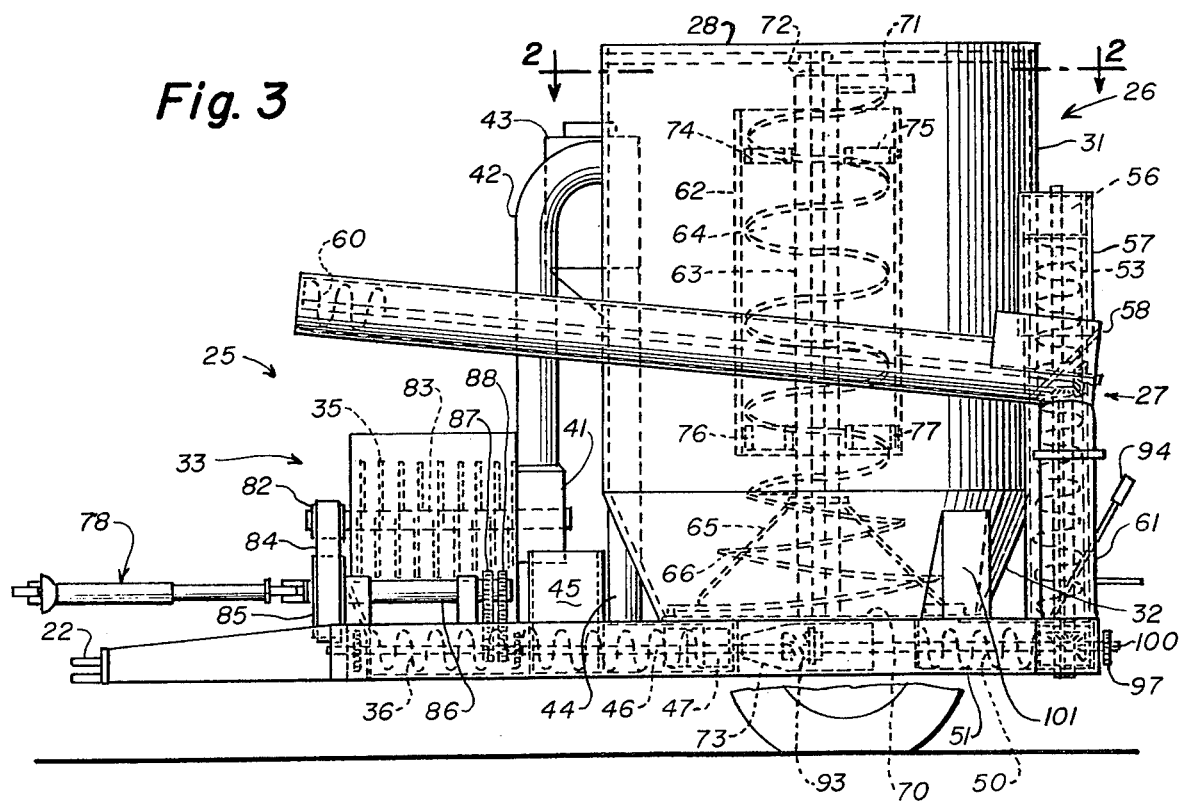
FIG. 3 is a side elevational view of a machine of the type illustrated in FIG. 1.

Now turning to mixing assembly 26, centrally located within the tank, it will be nteod that it comprises a rotatably mounted material advancing assembly disposed coaxial with a tubular auger housing 62. The material advancing assembly more specifically includes first and second material advancing portions the first of which comprises a vertical auger having a tubular core 63 and constant pitch spiral flighting 64 extending outwardly therefrom. The second and lowermost portion of the material advancing assembly consists of a frusto-conical shaped core member 65 and spiral flighting 66 wound upwardly and extending outwardly therefrom. Rigid crop engaging elements 67 and 68 extend outwardly from the circular lower edge 70 of the core member 65. The spiral flighting 66 commences from the trailing edge of rigid crop engaging element 68 and increases in pitch and width as it advances upwardly to terminate adjacent the top edge of frusto-conical shaped core member 65. Spiral flighting 64 on the upper portion of the rotatably mounted material advancing assembly commences at the termination of spiral flighting 66 and likewise tubular core 63 commences from and has a like diameter as the circular top edge of core 65. Generally, the rotatably mounted material advancing assembly provides auger flighting wound upwardly from the bottom portion of the mixing tank to the upper portion thereof and, in terms of function, acts to continually advance material from the bottom of the tank to the top. When the material being carried upwardly in housing 62 reaches the top, it is discharged outwardly through the space between auger housing 62 and top 28 which material thereupon gravitates back downwardly toward the lower portion of the tank. As shown in FIGS. 2 and 3, a radially extending paddle 71 is affixed to the top edge of flighting 64 to assist in the discharge of material from housing 62.

Viewing the centrally located vertical mixing assembly in more detail, it will be seen further in FIGS. 2 and 3 that the first and second portions are mouned for rotation on an internally supported upright shaft 72 centrally disposed in the tank. The shaft, rotatably driven via gearbox 73, is journalled in any suitable bearing means within the tank. The vertical auger housing 62 is affixed to the tank by pairs of upper and lower connecting rods 74,75 and 76,77, respectively, extending radially between the housing and the inner surface of the upper cylindrical section of the tank.

As seen in FIG. 3, lower frusto-conical shaped section 32 of the tank forms a trough-like area in the bottom of the tank by virtue of its relationship with frusto-conical shaped core 65 of the lower portion of the material advancing assembly. This circuilar shaped trough is further defined by the exposed ring-shaped portion of the bottom of the tank within the circular intersection between the bottom edge of the frusto-conical shaped wall and the bottom and the concentric projection of the bottom edge of core member 65. The upper limits of such trough are defined by an imaginary horizontal plane through the approximate intersection between the cylindrical section of the tank walls and the lower frusto-conical shaped section of the tank, which plane passes through the material advancing assembly in the general vicinity of intersection between lower frusto-conical core member 65 and tubular core member 63. This trough-like area, which is at the heart of the invention, extends upwardly a distance just less than 25 per cent of the total height of the tank, i.e., approximately one-fourth the distance between top 28 and bottom 30. The ring-shaped exposed bottom area, defined by the bottom edge of frusto-conical shaped wall section 32 and the projection of the adjacent circular lower edge of frusto-conical shaped core 65, is traversed by crop engaging elements 67 and 68 which pass through a plane parallel to and substantially encompassing the ring-shaped area in the bottom 30 of the tank.

All mechanisms of the grinder-mixer are adapted to be powered from the tractor (not shown) utilized to transport the machine. To this end, the grinder-mixer is provided with a forwardly extending power shaft 78 (shown in FIGS. 2 and 3 only) adapted to be interconnected with a tractor power takeoff shaft in a conventional manner. The power shaft 78 is drivingly interconnected with hammermill 33 via a belt drive, the main and auxiliary transfer auger assemblies via roller chain drives, the vertical mixing assembly via a shaft 80 coupled through a universal 81 (see FIG. 2) to gearbox 73, and the discharge auger assembly via the roller chain drive for the auxiliary transfer auger and thence through a positive engaging clutch (not shown in FIG. 1) to the rear portion of the machine.

More specifically, a driven pulley 82 on the hammermill rotor shaft 83 is driven by a belt 84 extending around drive sheave 85, mounted on a stub shaft 86. Drive connections for all powered assemblies are coupled through stub shaft 86 which is driven by power shaft 78. Fan 41 is also mounted for rotation on hammermill rotor shaft 83 and accordingly also powered by the hammermill belt drive. Stub shaft 86 drives the roller chains 87 and 88 which in turn rotatably drive shaft 80 for driving gearbox 73 and roller chain 90 which in turn drives auxiliary transfer auger 46. The main transfer auger 36 is drivingly interconnected with stub shaft 86 via roller chain 91 driven by a forward extending shaft member 92. On the rearward end of the shaft for auxiliary transfer auger 46 is a jaw clutch element of clutch 93 (see FIG. 3) whereby the shaft for horizontal discharge auger 50 may be selectively engaged. A clutch control 94 is utilized to positively engage clutch 93 by shifting shaft 95 about a fixed pivot support 96. Under conditions where the clutch horizontal discharge auger 50 is rotated via its shaft, which in effect becomes the drive shaft for the entire unloading assembly, i.e., it is coupled to chain drive 97 (FIG. 2) which rotates stub shaft 98 and stub shaft 100 which in turn, via bevel gearing, drive vertical discharge auger 53 and unload auger 60, respectively. Thus, the power shaft 78 drivingly interconnects the fan, hammermill, mixing assembly 28, the main transfer auger 36, the auxiliary transfer auger 48 and unloading assembly 27. In view of the conventional mechanisms involved in the various drive arrangements no further detailed description will be set forth.

Now turning to FIGS. 4–6, for a more detailed description of the lower portion of the vertical mixing assembly, the specific dimensions of the unique structure of lower frusto-conical shaped core member 65 in relation to spiral flighting 66 are shown. The width of spiral flighting 66 is narrowest at its lowermost edge where it commences at the rearward edge of rigid crop engaging element 68. The width thereof increases progressively as flighting 66 advances upwardly about core member 65 until it terminates at upper edge 102 after a second full turn has been completed. The width at edge 102 is substantially the same as the flighting width of the constant pitch spiral flighting 64 of the upper portion of the vertical mixing assembly. A collar member 103 is shown for readily connecting the lower assembly to the upper portion. Although the lower assembly shown in FIGS. 4–6 is adapted for ready removability for convenience of fabrication and servicing, the overall mixing assembly could be constructed in an integral manner without having any effect on the basic functioning of the apparatus. It should also be pointed out that although this embodiment of the invention contemplates the use of the two full turns of flighting, other arrangements in which more or less than two turns are used could accomplish the same result by altering the pitch and flighting width accordingly.

The mounting means for core member 65 more specifically comprise tubular core 104 for receiving upright shaft 72 (see FIG. 2) upon which the core member is affixed for rotation in a counterclockwise direction (FIG. 4). The tubular core 104 is rigidly secured in an upright position with core member 65 by means of four radially extending channel shaped struts 105,106, 107 and 108 secured to tubular core 104 and extending outwardly to core member 65. The struts are welded to the inner surface of core 65 in the vicinity of its lower edge as illustrated in FIG. 5. For further stability four ring segments 110, 111, 112 and 113 are welded to the channel shaped struts in the vicinity of the inner circumference of the lowermost edge of core member 65, as illustrated in FIG. 5. Rigid crop engaging elements 67 and 68 are affixed to the core member 65 by means of mounting brackets 114 and 115, respectively. Mounting bracket 114 will now be described (FIGS. 5 and 6) with respect to element 68. Bracket 115 for rigid crop engaging element 67, diametrically opposed to element 67, is identical in structure to 114 with the exception of its relationship to flighting 66. Mounting bracket 114 includes an upturned flange portion which is secured to strut 108 by means of a weld 116 as shown in FIG. 5. Affixed between channel shaped strut 108 and the inner end portion of mounting bracket 114 are opposing ends of ring segments 112 and 113. A flange bracket 117 is secured to the outer surface of core member 65 and extends outwardly parallel to the outer end of the mounting bracket 114 to provide further structural rigidity to the crop engaging elements. Crop engaging element 68 is secured between mounting bracket 114 and flange bracket 117 by means of four nut and bolt combinations countersunk into the mounting bracket 114. The inner pair of securement means is attached through cooperating holes in flange bracket 117. Lastly, with respect to rigid crop engaging elements 67 and 68, it can be seen in FIG. 6 that each element (68 shown in FIG. 6) is inclined downwardly toward the direction of travel obviating contact between bracket 114 and crop material in the path of element 68. The lowermost edge of the downturned forward portion of the element 68 is adjacent bottom 30 (shown in phantom in FIGS. 5 and 6) to facilitate movement of material resting on bottom 30 and thereby effectively initiate its advancement in a spiral path. Spacing between bottom 30 and the lowermost edge of elements 68 and 67 is provided as an obvious expedient, but for all practical purposes the relationship is considered one in which the elements pass directly in contact with the surface of bottom 30. The nominal clearance that has been found to be most feasible is about ½ inch.

In operation, a tractor is connected to main power shaft 78 to rotate stub shaft 86 which in turn drives the various mechanisms of the machine. Feed material is fed into hammermill hopper 34, processed and then conveyed via transfer auger 36 through opening 38 to the interior of the tank. Material is also fed into transfer auger 36 from tube 44 by virtue of dust collctor 43 which draws air through the hammermill and reroutes suspended feed particles to the tank via pipe 42. The auxiliary transfer auger also feeds material to the tank as may be desired, i.e., by means of feed concentrate hopper and auxiliary transfer auger 46, high protein additives or the like can be selectively introduced. Feed material and additives are continuously added to the tank until it is substantially full or until such time as no further material is available or desirable for introduction thereto. Materials entering through openings 38 and 48 in the tank bottom 30 are initially engaged by rigid crop engaging elemnts 67 and 68, and then immediately urged upwardly by virtue of spiral flighting 66 on the frusto-conical core member 65. Material is urged upwardly along flighting 66 until it reaches vertical auger housing 62 through which it is continued along its upward path until it reaches the top of vertical auger housing 62 and is discharged radially with assistance from paddle 71. The feed material then gravitates downwardly to the base of the mixing tank between the concentric circular walls of the tank and the outer surface of vertical auger housing 62.. It is intermixed with incoming material being introduced into the trough-like portion of the tank whereupon the circulating material is again urged upwardly by flighting 66 at such time as it reaches the lowermost point in its circuitous path which is in the vicinity of the trough-like portion of the tank. During this mixing operation, the unloading auger assembly is deactivated by declutching positive engaging clutch 93 and opening 52 is covered by any suitable closure means (not shown) that can be slidably positioned by means of a crank arm or the like. During an unloading operation, the closure is removed from opening 52 and material is discharged via the discharge assembly described above. The vertical mixing assembly continues to rotate during a discharge operation to enhance circulation and movement of material and thereby more rapidly and completely empty mixed material from the tank. To further enhance this discharge operation, a unique relieved portion 101 in the lower section of the tank wall is cut away from frusto-conical section 32 to permit use of a larger unimpeded discharge opening and thus provide more rapid discharge of mixed material. Relief portion 101 provides three vertical wall segments defining the cut away portion of the tank sidewall in the immediately vicinity of opening 52, through which material is discharged. Thus, this unique structure does not interrupt the shape of the lower frusto-conical shaped wall section 32 to any great degree and hereby leaves substantially undisturbed the trough-like area and its attendant improved function.

More particarly, with respect to the loading, mixing and unloading operations of the present machine, the unique structure of the lower portion of the mixing assembly provided a function, the effects of which were heretofore not contemplated. For example, during a mixing operation, when material is being urged upwardly in its circuitous path by virtue of the spiral flighting on core member 65, the unique structure of rigid crop engaging element 68 is adapted to scrape material from the bottom and facilitate its rapid advancement along the initial portion of the flighting by virtue of its relative position with respect to the leading edge of flighting 66. The downwardly inclined portion of the rigid crop engaging element moves across the exposed portion of bottom 30 to completely remove substantially all material resting thereon. Thus, the trough shaped portion of the tank exposes a ring-shaped portion of the bottom and thereby cooperates with the unique structure of the rigid crop engaging element to effectively and rapidly initiate the motion of all material it engages during each revolution. Aiding in the movement of material resting on the bottom is the provision of one or more optional rigid crop engaging elements such as element 67, shown in diametric opposition to 68 in FIG. 4.

A further and important advantage of the rigid crop engaging elements is the function performed during a loading operation. Both elements 68 and 67 come in contact initially with material being fed into the tank through principal opening 38 and supplemental opening 48. Hereagain, the inclined portion of the crop engaging elements and its relationship with bottom 30 enables the apparatus to immediately receive material being fed through the openings into the mixing tank and effectively advance such material upwardly along flighting 66. Still further, rigid crop engaging element 68 and others such as element 67 serve an important purpose during an unloading operation at which time the material is discharged through opening 52 to unloading assembly 27 via horizontal discharge auger 50. The rigid crop engaging elements are adapted to continually urge the material along the ring-shaped bottom portion until the tank is completely empty, i.e., a complete emptying operation is possible.

Therefore, it is obvious that the present invention presents a simple, reliable and relatively inexpensive grinder-mixer arrangement that will effectively provide for uniform and rapid mixing while minimizing bridging and enhancing the loading and unloading operations. The specific improved structure provides for efficient use of the mixing assembly from the standpoint of improved volume displacement, rapid loading and effective unloading.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus discribed the invention, what is claimed is:

1. In a mixing apparatus of the type including
   a frame,
   a tank supported by the frame, having a top, a bottom and outer wall means for confining feed material,
   means for transferring material into the tank,
   means for unloading material from said tank, and
   a vertical assembly mounted within the tank for mixing material fed into the tank, said assembly comprising a vertical auger housing and rotatably mounted material advancing means having a first portion comprising a vertical auger positioned partly within the housing for receiving material and advancing it upwardly through said housing and in improved second material advancing portion, below and axially aligned with said first portion, for advancing material upwardly to said first portion, said second portion including
   a. a core member having a frusto-conical outer surface converging upwardly between the bottom and the vertical auger of the first portion of the material advancing means, said outer surface having a substantially circular lower edge adjacent said tank bottom and a substantially circular upper edge located in the vicinity of the lower end of said vertical housing,
   b. spiral flighting extending outwardly from said outer surface and exposed to directly engage and advance upwardly materials being mixed, and
   c. a ring-shaped area defined between said circular lower edge of said core and the bottom of said outer wall means,
   d. at last one rigid crop engaging element fixed to the outer surface of the core member in the vicinity of the lower edge, said element extending substantially parallel to the bottom for traversing said ring-shaped area under conditions where said material advancing means are rotated to mix material within the tank.

2. A mixing apparatus, as set forth in claim 1, wherein the spiral flighting of said second portion of the material advancing means is continuously wound in a path around said outer surface from the lower edge to the upper edge to convey material from the bottom of the tank to the vertical auger housing, and said rigid crop engaging element is secured to said outer surface in the vicinity from which the spiral flighting commences its upward path.

3. A mixing apparatus, as set forth in claim 2, and including a second rigid crop engaging element fixed to the outer surface of the core member in the vicinity of the lower edge and substantially diametrically opposed to said one rigid crop engaging element.

4. A mixing apparatus, as set forth in claim 1, wherein said spiral flighting is wound in a path around said outer surface from a proximity in the vicinity of said bottom to a proximity in the vicinity of said auger housing, wherein said rigid crop engaging element has leading and trailing edges in accordance with the established direction of rotation of the material advancing means for advancing material upwardly, said leading edge extending substantially radially and said trailing edge extending adjacent the proximity in the vicinity of the bottom from which said spiral flighting is wound.

5. A mixing apparatus, as set forth in claim 4, wherein said bottom includes a flat inner surface and said rigid crop engaging member includes a forward portion inclined downwardly and forwardly whereby said leading edge travels in a plane parallel and adjacent said flat inner surface.

* * * * *